United States Patent Office 2,959,588
Patented Nov. 8, 1960

2,959,588
PREPARATION OF MELAMINE

Byron L. Williams, Jr., Texas City, Tex., assignor to Monsanto Chemical Company, St. Louis, Mo., a corporation of Delaware No Drawing. Filed Mar. 21, 1958, Ser. No. 722,833

10 Claims. (Cl. 260—249.7)

The present invention relates to a novel method for the preparation of melamine.

We have discovered that melamine may be produced by the reaction of ammonia and cyanogen according to the following equation:

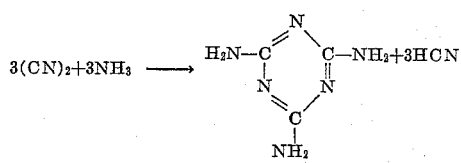

According to the invention, ammonia and cyanogen are contacted at an elevated temperature with a dehydrogenation catalyst and melamine is recovered from the reaction product. The invention is illustrated in the following example, which, however, is not to be construed as limiting it in any manner.

Example

A quartz tube about 30 in. long and approximately 1 in. in diameter was employed as a reactor. A bed of a dehydrogenation catalyst about 4 in. in depth was supported within the reactor on a circular porous quartz plate located at about the midpoint of the tube. The reactor was heated by means of resistance-wire wrapping covered by the necessary insulation. Temperatures in the tube and catalyst bed were recorded by means of a sliding iron-constantan thermocouple inserted in a quartz thermowell which extended throughout the catalyst bed.

The gaseous reactants, ammonia and cyanogen, were fed at controlled rates through flowmeters into a mixer of the cyclone type then passed from the mixer into the reactor and through the catalyst bed heated to the desired temperature. The reaction products were collected in a flask attached to the bottom of the reactor and in two other connected containers functioning as traps for the effluent gases and attached to an outlet near the bottom of the reactor. The traps were maintained at a temperature of 0–5° C. and —75° C., respectively. Melamine present in the crude collected product was extracted with hot water and then recovered by crystallization from the solution. The melamine product was identified by means of the melting point of its picric acid derivative as well as by its infrared spectra.

A series of runs were made following the method outlined above using several different dehydrogenation catalysts. The catalyst bed was heated to a temperature of 400° C. except in the run with the chromium oxide catalyst in which the temperature was 375° C. and the flow of gases was regulated to give a catalyst contact time of 1.1 seconds. The ratio of ammonia to cyanogen employed was 4:1 and reaction time was one hour. Yields of melamine obtained with the various catalysts employed are presented in the following table.

| Run No. | Catalyst | Yield (Crude Melamine) |
|---|---|---|
| 8 | Palladium (0.5 wt. percent) on alumina in pelletized form having a surface area of 125 m.²/g. (Houdry Chemical Corp. Code No. HA 100 SRL). | 40 |
| 9 | Platinum supported on alumina (Houdry Chemical Corp. Code No. 263JX18-1)[1]. | 40 |
| 10 | Palladium (5.0 wt. percent) on alumina (Houdry Chemical Corp. Code No. 314JX1-2X1). | 50 |
| 13 | Surface-activated cobalt impregnated on alumina (The Girdler Co. T-303 No. 2496-A). | 25 |
| 14 | Activated alumina impregnated with 18-20% chromic oxide (Houdry Chemical Corp. Code No. 60H3241). | 31 |

[1] The catalyst as received was chloroplatinic acid impregnated on alumina. This was reduced to metallic platinum by firing in air for 2 hours at 825° C.

While the example names specific catalysts, temperatures, reactant ratios and the like, it is to be understood that the invention is not to be limited to the specific conditions set forth therein, but substantial variation in conditions may be made without departing from the scope of the invention. For example, any temperatures within the range from 350° to 750° C. may be used, depending upon the catalyst chosen. Preferably, the temperature of the catalyst bed is maintained between 400°–600° C. The reaction is exothermic to some extent and external heat input, therefore, is minimized after the reaction is initiated.

The cyanogen and ammonia may be present in almost any mole ratio from 1:1 to 1:20 or even wider. Preferably, however, the ammonia is maintained in excess and mole ratios of ammonia to cyanogen of 4:1 to 10:1 are considered the most practical.

Any dehydrogenation catalyst is suitable. Particularly preferred are the metals of group VIII in the periodic system or any mixture or combination of these metals. The metals can be used per se or on a carrier. Any of the commonly used catalyst supports are suitable. In addition to alumina mentioned in the example, charcoal, silica gel, fuller's earth, kaolin, and the like are all suitable materials. Oxides or salts of the metals of group VIII may also be used.

Another class of dehydrogenation catalysts which are particularly efficient are the oxides of bi- or trivalent chromium alone or materials such as those mentioned above, alumina, charcoal, silica gel, etc., impregnated with these oxides. Also suitable are chromium oxide catalysts in which there are incorporated small amounts of stabilizing agents such as the difficultly-reducible oxides of zirconium, titanium, silicon and the like, or of light reducible oxides of tellurium, beryllium, and the like. Highly active chromoxide gels may also be employed.

What is claimed is:

1. A process for producing melamine which comprises reacting cyanogen and ammonia at a temperature in the range from about 350° C. to about 750° C. in the presence of a dehydrogenation catalyst chosen from the group consisting of the oxides of chromium and the metals of group VIII of the periodic system.

2. A process for producing melamine which comprises reacting cyanogen and ammonia at a temperature in the range from about 350° C. to about 750° C. in the presence of a dehydrogenation catalyst comprising chromium oxide.

3. A process for producing melamine which comprises reacting cyanogen and ammonia at a temperature from about 400° C. to about 600° C. in the presence of a supported chromium oxide catalyst.

4. A process for producing melamine which comprises passing cyanogen and ammonia in a mole ratio of 1:4 to 1:10 over a bed of a catalyst comprising activated alumina impregnated with chromic oxide maintained at a temperature in the range from about 400° C. to about 600° C.

5. A process for producing melamine which comprises reacting cyanogen and ammonia at a temperature in the range from about 350° C. to about 750° C. in the presence of a dehydrogenation catalyst comprising a metal from group VIII of the periodic system.

6. A process for producing melamine which comprises reacting cyanogen and ammonia at a temperature from about 350° C. to about 750° C. in the presence of a dehydrogenation catalyst comprising a metal of group VIII of the periodic system supported on a carrier.

7. A process for producing melamine which comprises passing cyanogen and ammonia in a mole ratio of 1:4 to 1:10 over a bed of a dehydrogenation catalyst comprising a metal of group VIII of the periodic system of the elements supported on alumina and recovering the thus-formed melamine.

8. The process of claim 7 wherein said metal of group VIII is palladium.

9. The process of claim 7 wherein said metal of group VIII is platinum.

10. The process of claim 7 wherein said metal of group VIII is cobalt.

References Cited in the file of this patent

Jacobsen: Berichte Deutsche Chemische Gesellschaft, vol. 4, pp. 949 and 955 (1871).